US007961138B1

(12) United States Patent
Govoni

(10) Patent No.: US 7,961,138 B1
(45) Date of Patent: Jun. 14, 2011

(54) DETECTING OPERATIONAL RADAR ANGLES BASED ON WAVELENGTH SPECIFIC ELECTROMAGNETIC PROPAGATION AND SURFACE INTERACTION

(75) Inventor: Mark A. Govoni, Abingdon, MD (US)

(73) Assignee: The United States of America as respresented by the Secretary of the Army., Washington, DC (US)

( * ) Notice: Subject to any disclaimer, the term of this patent is extended or adjusted under 35 U.S.C. 154(b) by 52 days.

(21) Appl. No.: 12/584,589

(22) Filed: Aug. 25, 2009

(51) Int. Cl.
*G01S 13/00* (2006.01)
(52) U.S. Cl. .......................................... 342/74; 342/147
(58) Field of Classification Search ............ 342/73–103, 342/176, 188
See application file for complete search history.

(56) References Cited

U.S. PATENT DOCUMENTS
2008/0246647 A1* 10/2008 Hellsten .......................... 342/22

OTHER PUBLICATIONS

M. Long, "Radar Refelectivity of Land and Sea", Artech House, Inc., 1983, p. 101.

* cited by examiner

*Primary Examiner* — Thomas H. Tarcza
*Assistant Examiner* — Timothy A Brainard
(74) *Attorney, Agent, or Firm* — Michael Zelenka; Stephen J. Harbulak

(57) ABSTRACT

A detector apparatus, detection system, and method are provided for determining optimum operational angles based on the statistical correlation of wavelength-specific electromagnetic propagation and surface interaction. These techniques can be used within the radar community in both military and commercial radar applications for airborne radar system users to determine optimum operational depression angles based on the purpose of the effort, the operational frequency, and the terrain-type to be encountered. The method requires the user to interface with a standard computer equipped with the commercially available MATLAB® software package where the operation is presented as a graphic user interface (GUI) that once invoked allows the user to set specific parameters corresponding to the desired terrain type. Upon doing so, the algorithms are exercised and the results are displayed in a series of figures identifying the optimum operational angles.

15 Claims, 9 Drawing Sheets

US 7,961,138 B1

DETECTING OPERATIONAL RADAR ANGLES BASED ON WAVELENGTH SPECIFIC ELECTROMAGNETIC PROPAGATION AND SURFACE INTERACTION

GOVERNMENT INTEREST

The invention described herein may be manufactured, used and licensed by or for the Government of the United States of America without the payment by the Government of any royalties thereon.

FIELD OF THE INVENTION

The present invention pertains generally to radar systems and methods. More particularly, the present invention pertains to devices and methods to detect a range of optimal depression angles.

BACKGROUND OF THE INVENTION

Radar technology has transformed numerous aspects of travel and communications, including civilian and military air traffic control, defense equipment, and warfare, and has been adapted to many different applications. One particularly important application for radar is the airborne platform where the pilot or navigator can monitor other air traffic or locate a specific target, whether it is a civilian airport or an enemy encampment. The current practice for establishing airborne radar telemetry, or the radar's aspect to the ground or coverage area, is usually done prior to the mission without any meaningful consideration for optimum operational angles as a function of the purpose of the effort, the transmit frequency, and the anticipated terrain-type to be encountered. The users often improvise as to where they believe that the system will be most productive or employ trial and error techniques to estimate the operational angles, geographical parameters, and other factors. However, such estimates can be inaccurate because airborne radar systems invariably encounter a number of problems that are inherent with the airborne platform but not necessarily foreseeable during pre-flight mission planning, such as difficulties caused by signal degradation of RF transmission. This inaccuracy and lack of reliability also causes current airborne telemetry techniques to be inefficient from a time management and data collection point of view because the task needs to be repeated multiple times.

Although the basic phenomenology of radar returns is well-known to those skilled in the art and regularly employed to optimize the return signals within a single band, there has not yet been a systematic investigation of the correlation properties of returns generated within the same band using different polarization types. The lack of any systematic understanding of radar return correlation properties plus the current imprecise and ineffective trial and error approach to radar telemetry have led to numerous problems and difficulties with airborne radar systems. In order to overcome the prior art's difficulties, shortcomings, and limitations caused by the failure to systematically understand radar return correlation properties, the lack of accurate data collection, and the inefficiency of current data collection efforts, there has been a long-felt need for an airborne telemetry technique based on a more systematic understanding of radar return correlation properties that properly considers the optimum operational angles as a function of the purpose of the effort, the transmit frequency, and the terrain-type to be encountered during flight.

SUMMARY OF THE INVENTION

This invention's detection devices, apparatus, and methods resolve and overcome the long-standing disadvantages, shortcomings and limitations of the prior art's inaccurate and improvisational approach to airborne radar telemetry by providing airborne telemetry techniques that are based on a more systematic understanding of radar return correlation properties, and properly utilize optimum operational angles as a function of the purpose of the effort, the transmit frequency, and the terrain-type to be encountered during flight. The present invention provides an innovative optimum operational depression angle detector using a statistical cross-correlation metric and Graphical Use Interface (GUI) methodology that rapidly identifies a range of optimal depression angles where appreciable reflection can be expected. In accordance with the present invention, the detector and metric displayed in a GUI format allows the user to circumvent the constant questions and concerns about which type of polarization is more appropriate for a given a set of operational conditions. Up until now, this invention's correlation techniques have never been applied to difficulties with airborne radar systems. Not only does this invention provide optimum operational depression angle detector with statistical cross-correlation metric, and GUI methodology, but it is also statistically-based and much more efficient from a time management and data collection point of view.

Thus, it is an object of the present invention to provide a device to detect operational radar angles with a statistical cross-correlation metric.

It is still another object of the present invention to provide an operational radar angles detector apparatus using a statistical cross-correlation metric and GUI methodology that rapidly identifies a range of optimal depression angles where appreciable reflection can be expected.

It is yet another object of the present invention to provide a system for detecting operational radar angles using a statistical cross-correlation metric and GUI methodology that rapidly identifies a range of optimal depression angles based on wavelength specific electromagnetic propagation and surface interaction.

It is still a further object of the present invention to provide a method for detecting operational radar angles based on using a statistical cross-correlation metric and GUI methodology that rapidly identifies a range of optimal depression angles where appreciable reflection can be expected based on wavelength specific electromagnetic propagation and surface interaction.

These and other objects and advantages are provided by this invention's technique for detecting operational radar angles using a statistical cross-correlation metric that rapidly identifies a range of optimal depression angles where appreciable reflection can be expected based on wavelength specific electromagnetic propagation and surface interaction that generates a series of GUI computer screens for selecting the relevant airborne radar parameters, type of terrain, and other pertinent factors. The present invention uses the MATLAB® computer program organizing and selecting the relevant airborne radar parameters. The detector device, system, and method all provide a final output as automatic instructions to the airborne radar system and a computer screen display for the pilot or navigator. This invention is useful for both commercial and military airborne radar systems in that it provides a necessary understanding of the basic phenomenology involved in multi-band radar returns. The phenomenology provides insight into the independence or redundancy of multi-band returns for certain applications, and leads to possible criteria for optimal frequency band and depression angle selection.

The present invention encompasses an operational radar angles detector apparatus rapidly identify a range of optimum depression angles with GUI methodology, a storage medium encoded with machine-readable computer program code for an operational radar angle detection system computer to rapidly identify a range of optimum depression angles with GUI methodology, and a method for detecting operational radar angles to rapidly identify a range of optimum depression angles with a Graphical User Interface (GUI)

DETAILED DESCRIPTION OF THE DRAWINGS

This invention's device to detect operational radar angles using a statistical cross-correlation metric and GUI methodology to rapidly identify a range of optimal depression angles overcome the prior art's shortcomings, disadvantages, and limitations and answers the long-felt need for airborne telemetry techniques that are based on a systematic understanding of radar return correlation properties that is statistically-based and much more efficient from a time management and data collection point of view. Radar telemetry refers to the radar's aspect to the ground or coverage area in focus sometimes called the "ground reference coverage area" or GRCA. More specifically, radar, unlike an electro-optical system, does not have an infinite viewing plane due to the fact that its radiated energy attenuates as a function of range and atmospheric losses. Those skilled in the art readily appreciate that the airborne radar telemetry primarily embodies the depression angle and squint angle while maintaining cognizance of the aircraft's translation, i.e. altitude; ground speed; yaw; pitch; and roll.

This invention's techniques for detecting operational radar angles using a statistical cross-correlation metric to rapidly identify a range of optimal depression angles where appreciable reflection is expected due to wavelength specific electromagnetic propagation and surface interaction. This invention's detectors, systems, and methods all use the MATLAB® computer program to organize and select the relevant airborne radar parameters and advantageously generates a GUI computer screen with a series of drop down menus for selecting specific airborne radar parameters, type of terrain, and other pertinent factors. In accordance with the present invention, the detectors, systems, and methods all provide a final output as automatic instructions to the airborne radar system for making pre-flight, or even in-flight, adjustments as well as a computer screen display for the pilot or navigator.

Figure 1:
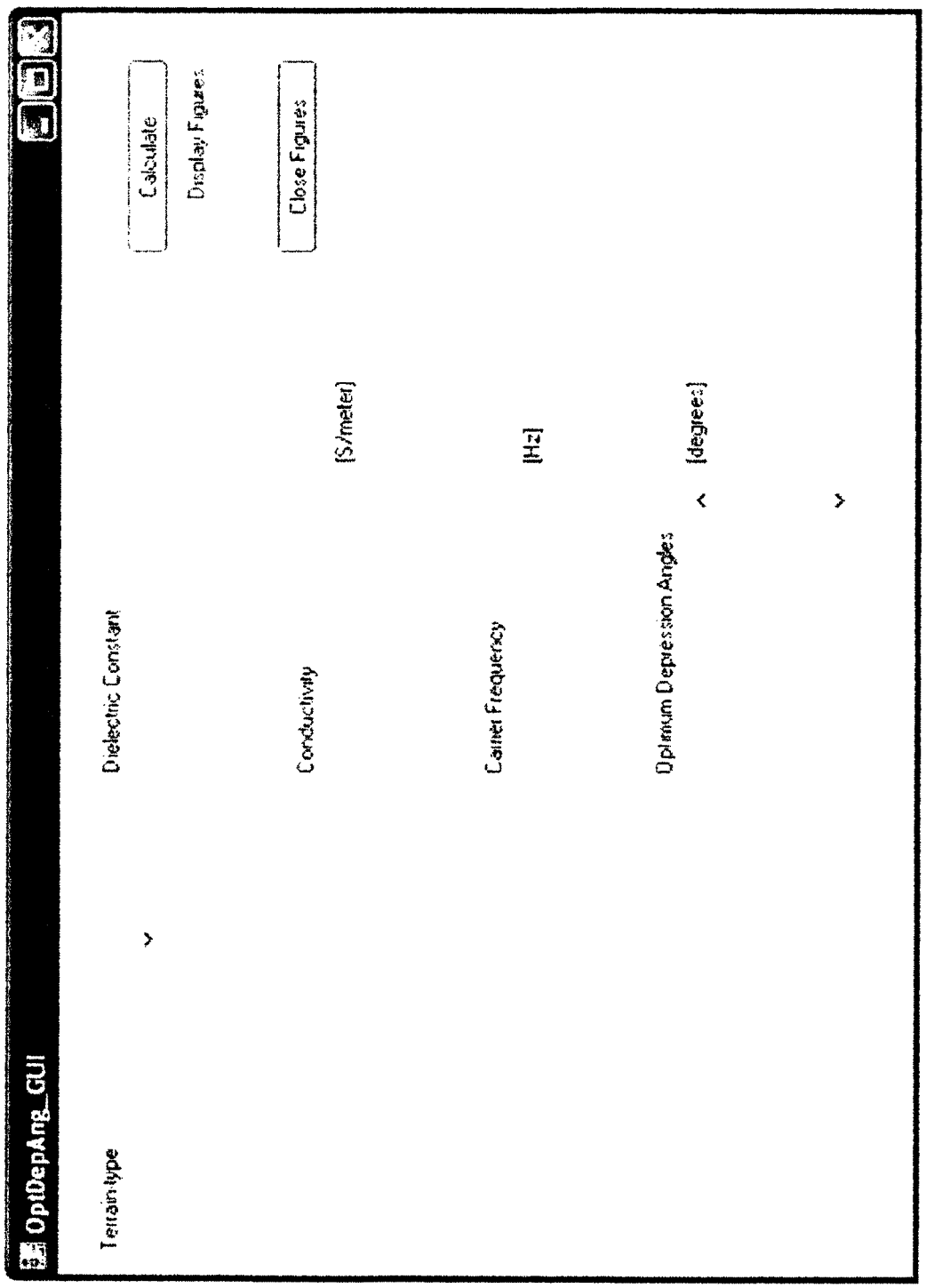
FIG. 1 is a computer screen depicting the GUI initialization shell of this invention.
Figure 2:
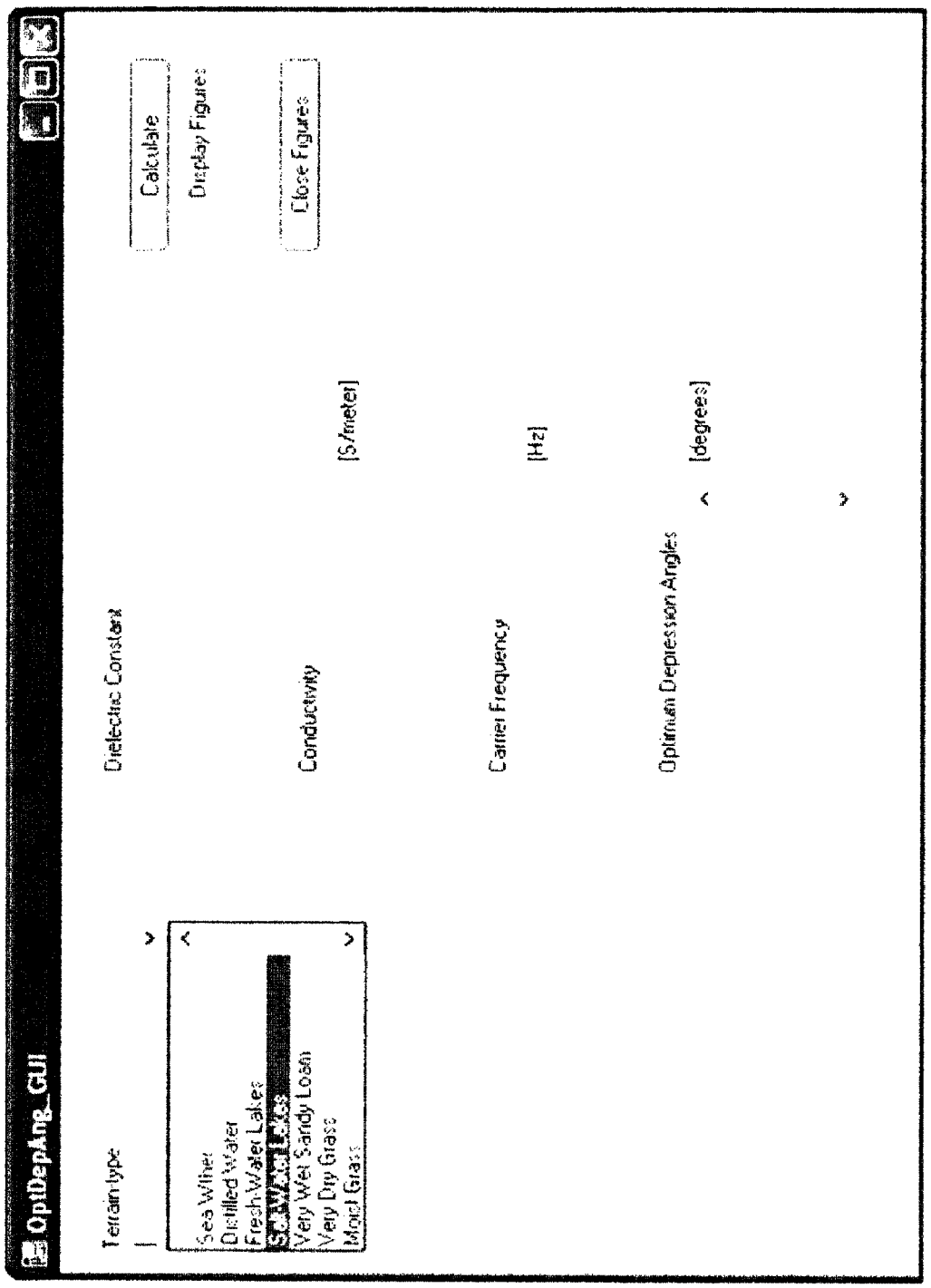
FIG. 2 is a computer screen depicting a terrain drop-down menu in accordance with this invention.
Figure 3:
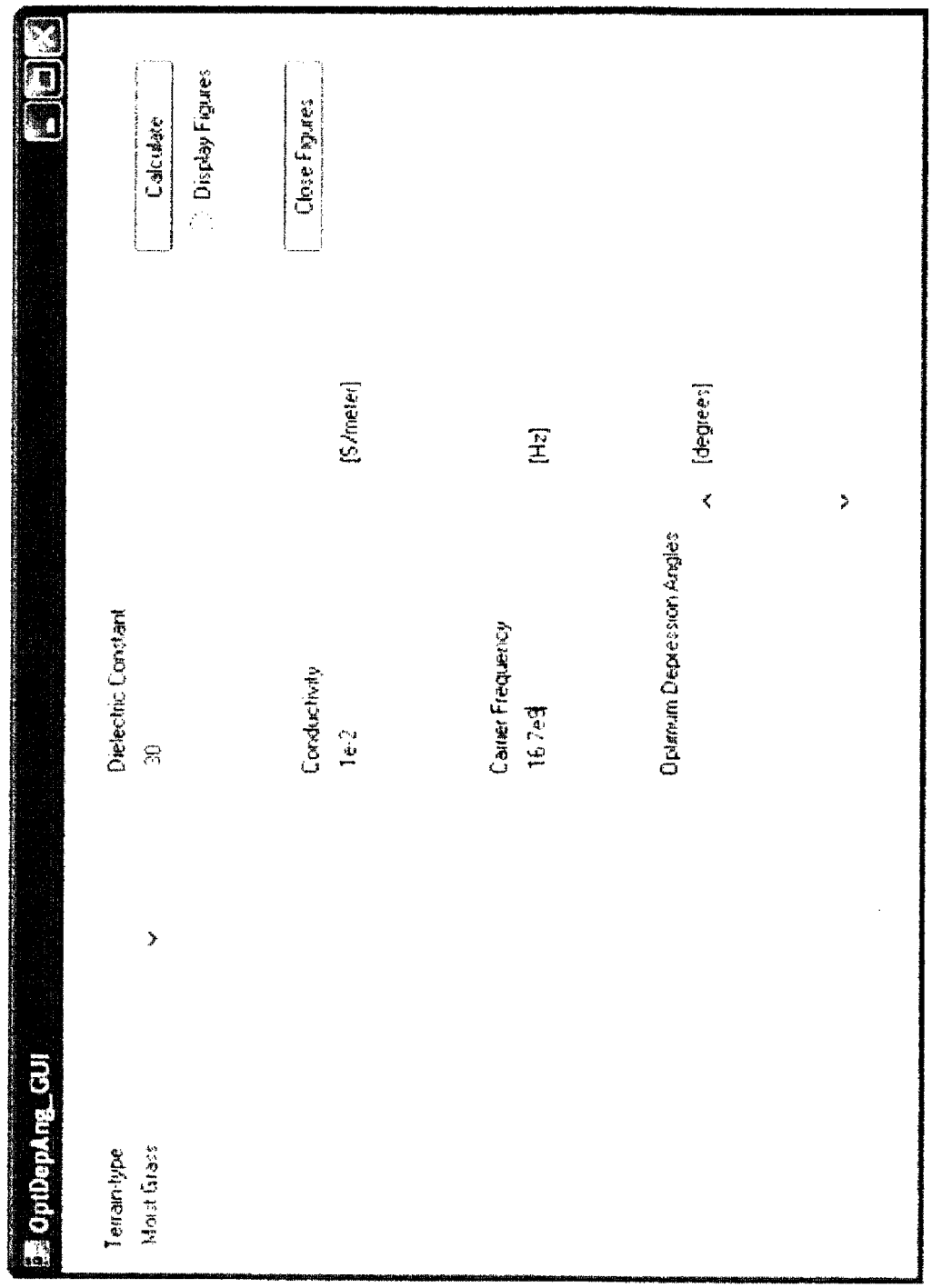
FIG. 3 is a computer screen depicting a computer field for the user to insert carrier frequency in accordance with this invention.
Figure 8:
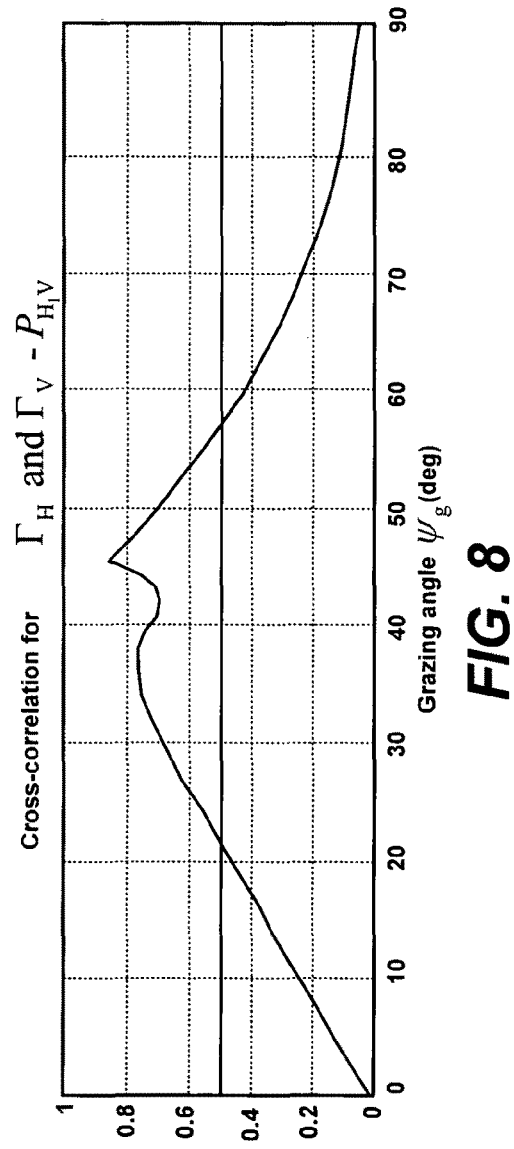
FIG. 8 is a chart depicting a cross correlation plot in accordance with this invention.
Figure 9:
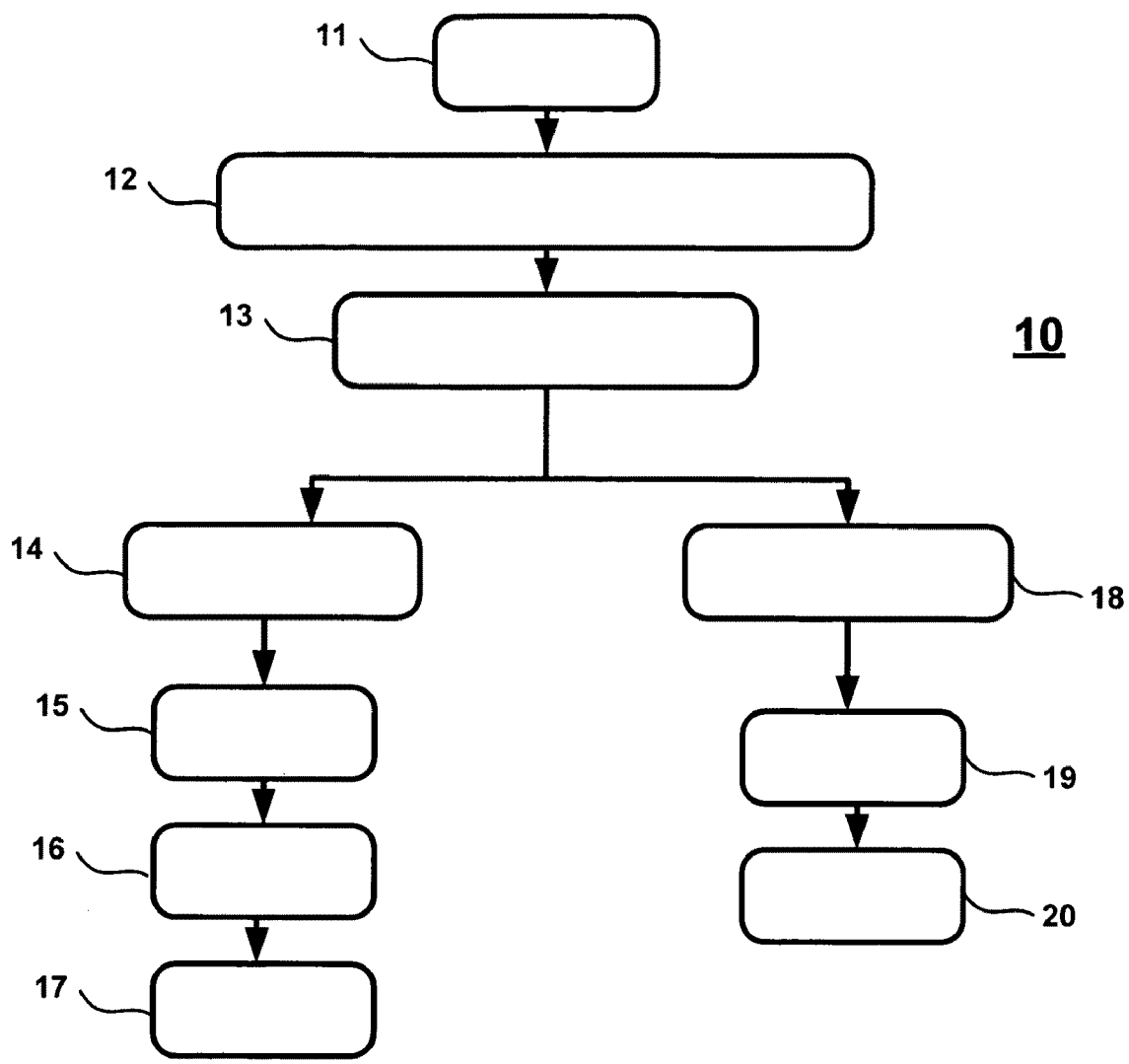
FIG. 9 is a flow diagram illustrating the operation of this invention's operational radar angle detector apparatus.

Referring now to the drawings, FIGS. 1-8 depict computer screens and charts that illustrate detailed aspects of this invention. FIG. 9 is a flow diagram illustrating the operation of this invention's operational radar angle detector apparatus to rapidly identify a range of optimum depression angles with a GUI in a computer 10. In a means for initializing this invention's GUI, represented by Box 11, the user commences the optimum radar angle detection effort by opening this invention's GUI in a computer program using the MATLAB software package as depicted in FIG. 1. Using a means for setting inputs, represented by Box 12, the user inserts the terrain-type inputs with a drop-down menu, as illustrated in FIG. 2, the device automatically populates the dielectric constant and conductivity fields, and the user and enters a carrier frequency input, as illustrated in FIG. 3. These parameters consist of the real part of the complex dielectric constant $\in'$, the conductivity $\sigma$(S/m) of the surface, and the carrier frequency $f_c$(Hz) of the radar system.

A means for calculations, as represented by Box 13, is activated by the user with the Calculate command, and the calculations means automatically selects the necessary radar algorithms to populate the Optimum Depression Angles field with a range of optimum depression angle values based on the terrain-type input, dielectric constant setting, conductivity setting, and carrier frequency input. The range of optimum depression angles can be viewed by the user moving the slider bar up or down, and the same results may also be viewed by the user in a means for display, as represented by Box 14. In accordance with the present invention, the detector apparatus correlates the properties of radar returns generated in multiple, widely disparate bands in an advantageous way unknown to the prior art. The calculation means 13 also provides a cross-correlation matrix of the horizontally and vertically polarized electromagnetic wave where optimum depression angles are identified for the purposes of reflection, and identifies the ground penetration angle.

Irrespective of whether the user selects the display option, the calculations means 13 sends the results for detecting the optimum depression angle directly to the airborne radar system. When the user has selected the display option, the display means, represented by Box 15, displays charts of the kind depicted in FIGS. 6-8. When the user has not selected the display option, the calculations means, Box 13 sends the necessary information directly to the airborne radar system, represented by Box 16.

FIG. 1 depicts the initialization shell of this invention's Optimum Depression Angle GUI allowing the user to select a number of critical airborne radar parameters. The selectable parameters and tabs include type of terrain, dielectric constant, conductivity, carrier frequency and optimum depression angles. FIG. 2 illustrates the terrain-type drop down menu, which has been circled for emphasis that allows the user to initially choose a terrain type, such as sea water, fresh-water lakes, very dry sandy loam, and so on. FIG. 3 depicts three (3) computer fields that need to be completed. The dielectric constant and conductivity fields are automatically populated after the user completes the terrain-type drop down menu. This invention's detector requires the user to manually enter a carrier frequency value into that area.

Figure 4:
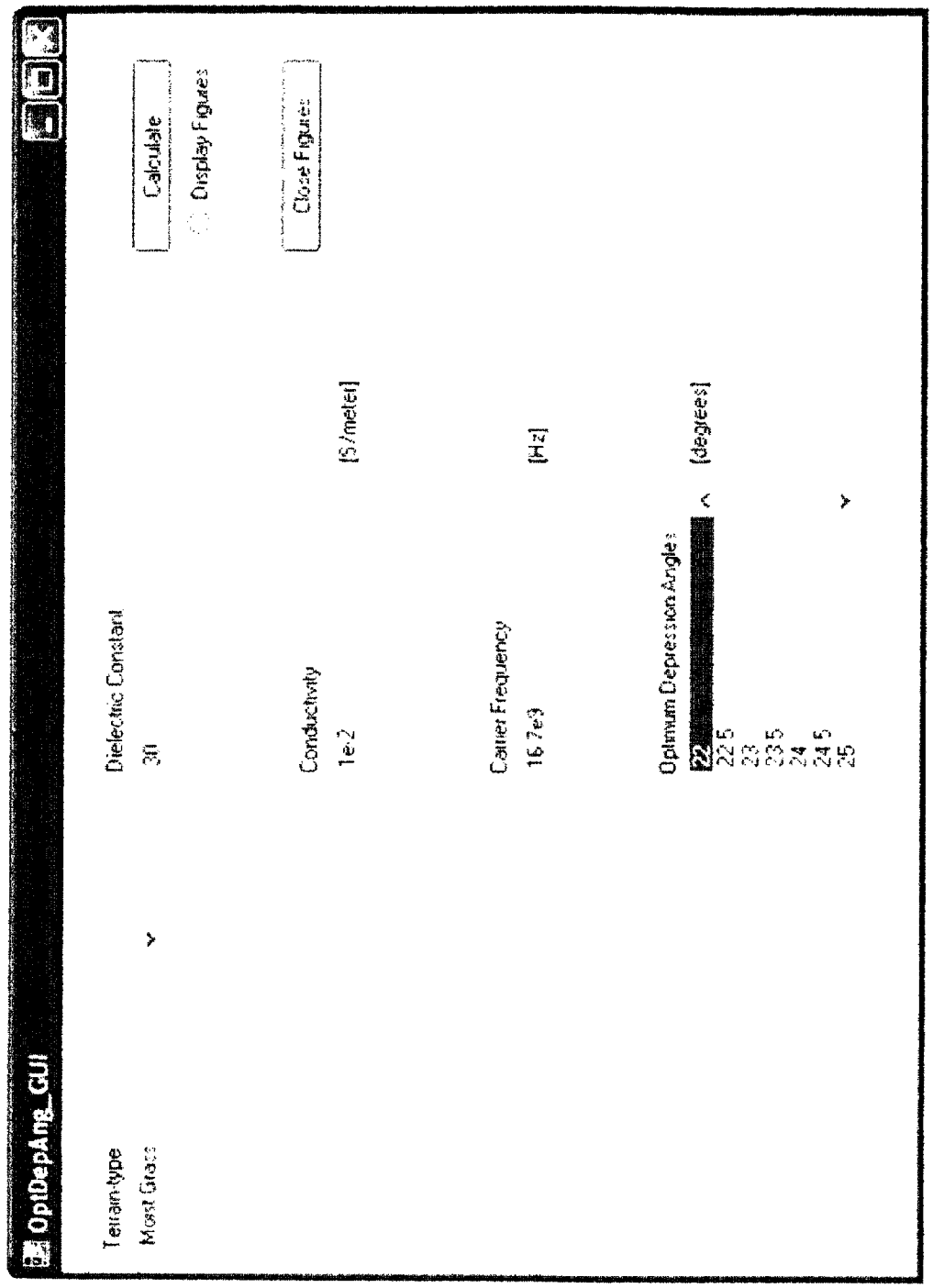
FIG. 4 is a computer screen depicting a slider bar with different optimum depression angles after clicking onto the Calculate button in accordance with this invention.
Figure 5:
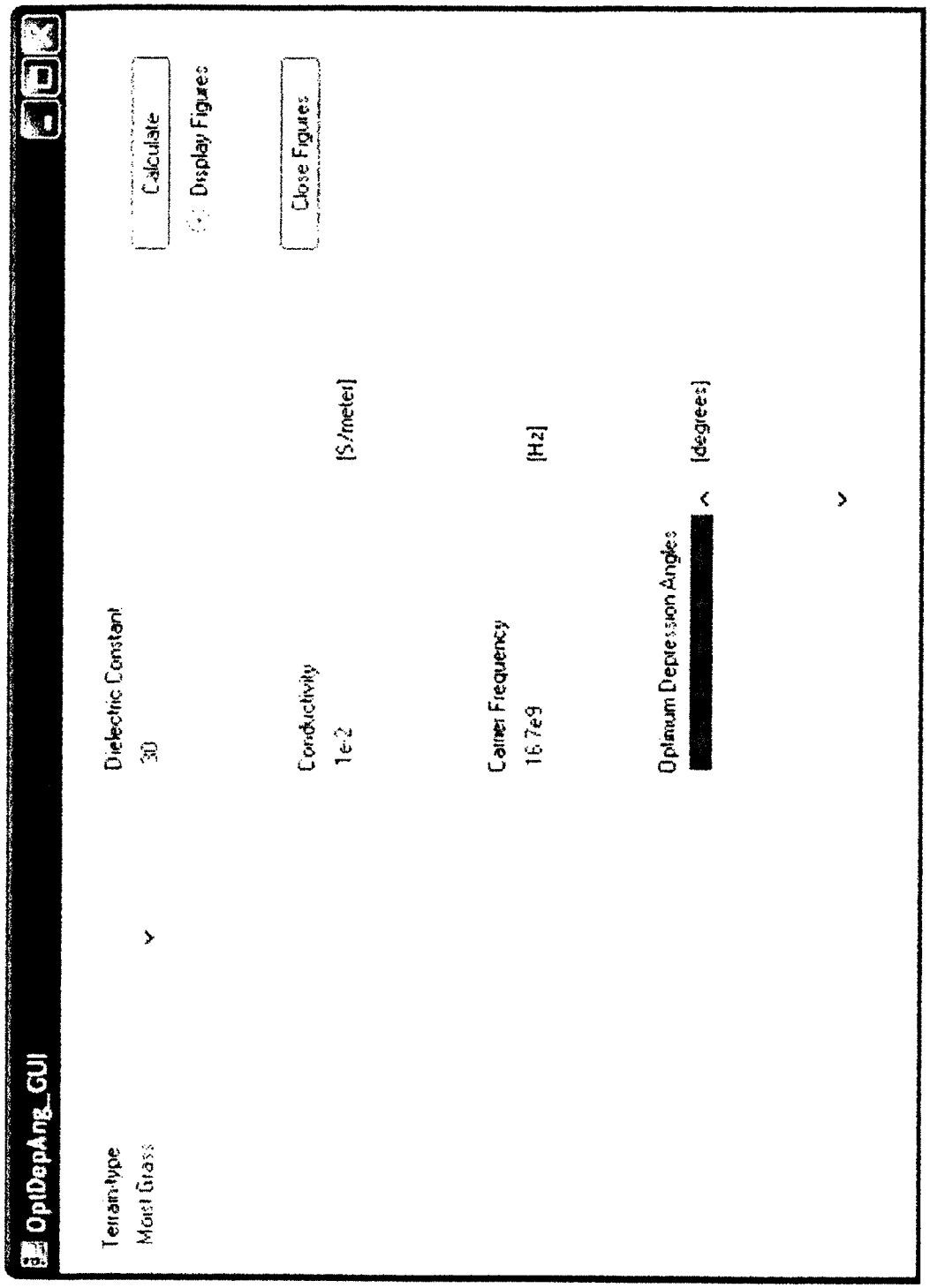
FIG. 5 is a computer screen illustrating a radio button to display figures that correspond to the calculations in accordance with this invention.

Referring now to FIG. 4, once the user has completed selecting the terrain-type and carrier frequency parameters, the computer screen for invoking internal algorithm synthesis is depicted. The device automatically user selects the necessary algorithms after the user clicks on the Calculate button. Once the Calculate command is given, this invention's detector populates the Optimum Depression Angles field with a range of optimum depression angle values that can be viewed by the user moving the slider bar up or down. FIG. 5 depicts the computer screen that allows the user to graphically display the necessary calculations. It should be noted that the results of detecting the optimum depression angle will be sent to the airborne radar system irrespective of whether the user selects the display option.

Figure 6:
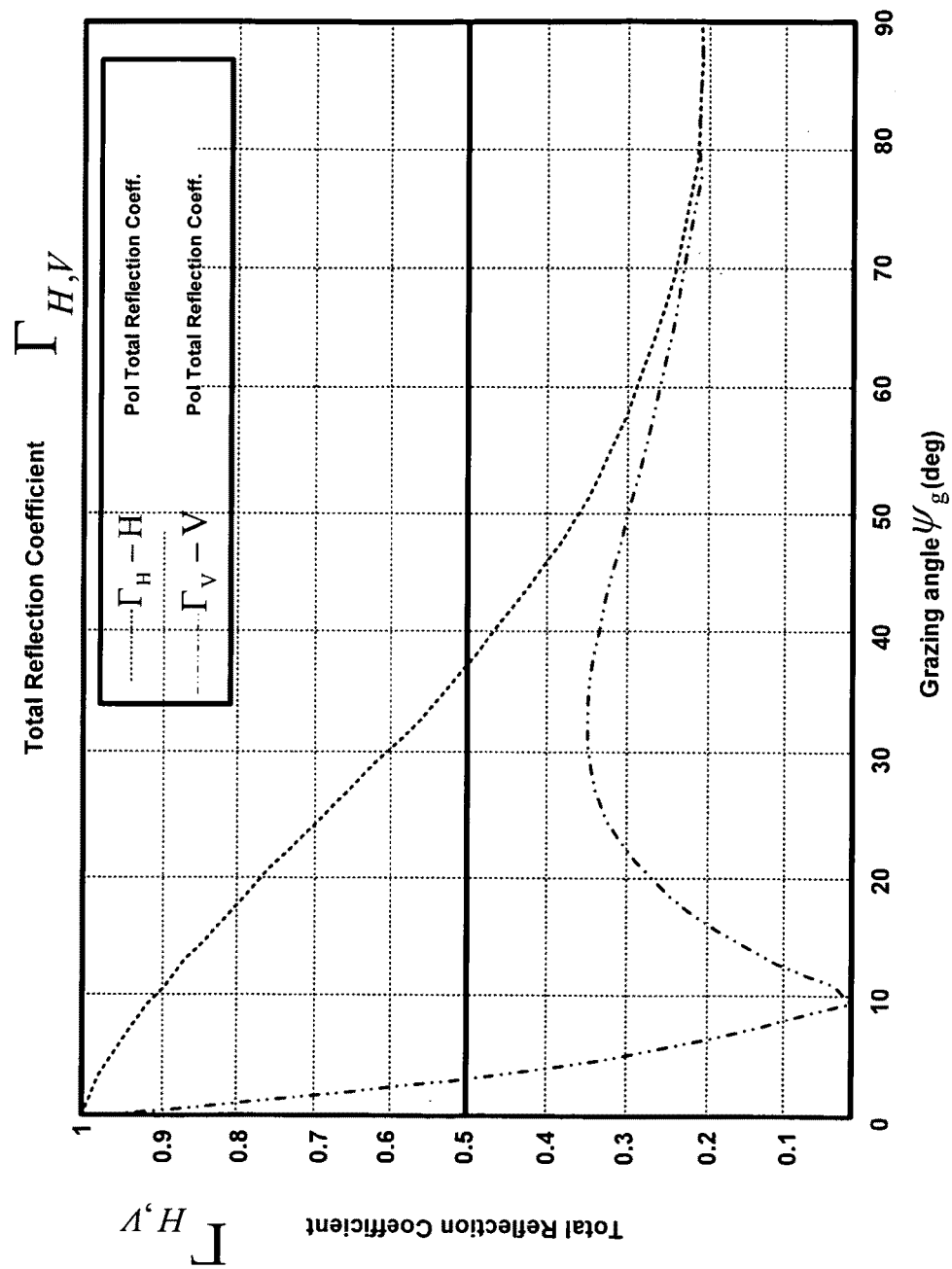
FIG. 6 is a chart depicting a plot showing the total reflection coefficient in accordance with this invention.
Figure 7:
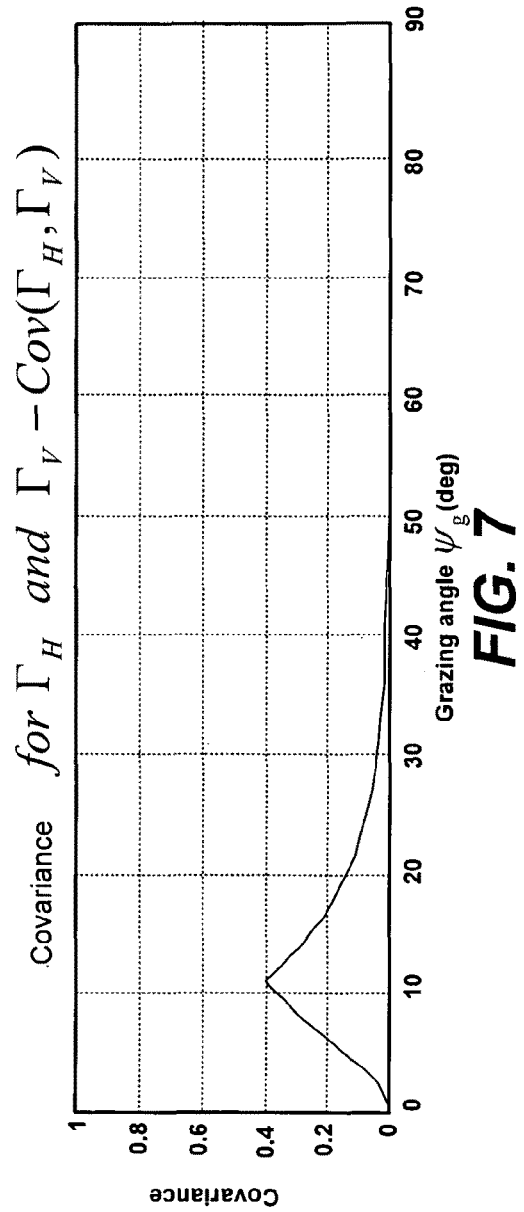
FIG. 7 is a chart depicting a plot of covariance calculations for the total reflection coefficient in accordance with this invention.

In those instances where the user has selected the display option, FIG. 6 depicts a first plot that shows the total reflection coefficient for both the horizontal and vertically polarized electromagnetic waves, where $\in'=30$, $\sigma=0.01$, and $f_c=16700000000$. The FIG. 7 chart depicts a plot of covariance calculations for the total reflection coefficient of the horizontal and vertically polarized electromagnetic waves with the same parameter settings that were made for the FIG. 6 plot. FIG. 8 is a chart depicting the cross-correlation plot for the information presented in FIG. 7. It should be noted that the dark line drawn across the FIG. 8 cross-correlation plot indicates the minimum selection threshold used in determining the optimum depression angles in accordance with this invention.

Numerous variations of this invention's operational radar angle detector apparatus to rapidly identify a range of optimum depression angles with a GUI in a computer are possible. The possible variations include user electing to not view the optimum depression angle result in the display means, the range of optimum depression angles can be viewed by the user moving a slider bar up or down; the dielectric constant input being a real part of a complex dielectric constant $\in$', the conductivity input being a conductivity $\sigma(S/m)$ of the earth's surface, and the carrier frequency input being a carrier frequency $f_c(Hz)$ of the airborne radar system. Other variations include the user selecting the group of terrain-type inputs from a drop down menu and the apparatus being operated by a group of computer software programs.

The present invention also encompasses a storage medium encoded with machine-readable computer program code for an operational radar angle detection system computer to rapidly identify a range of optimum depression angles with a GUI and many of the variations of the apparatus embodiment also apply to this embodiment.

Figure 10:
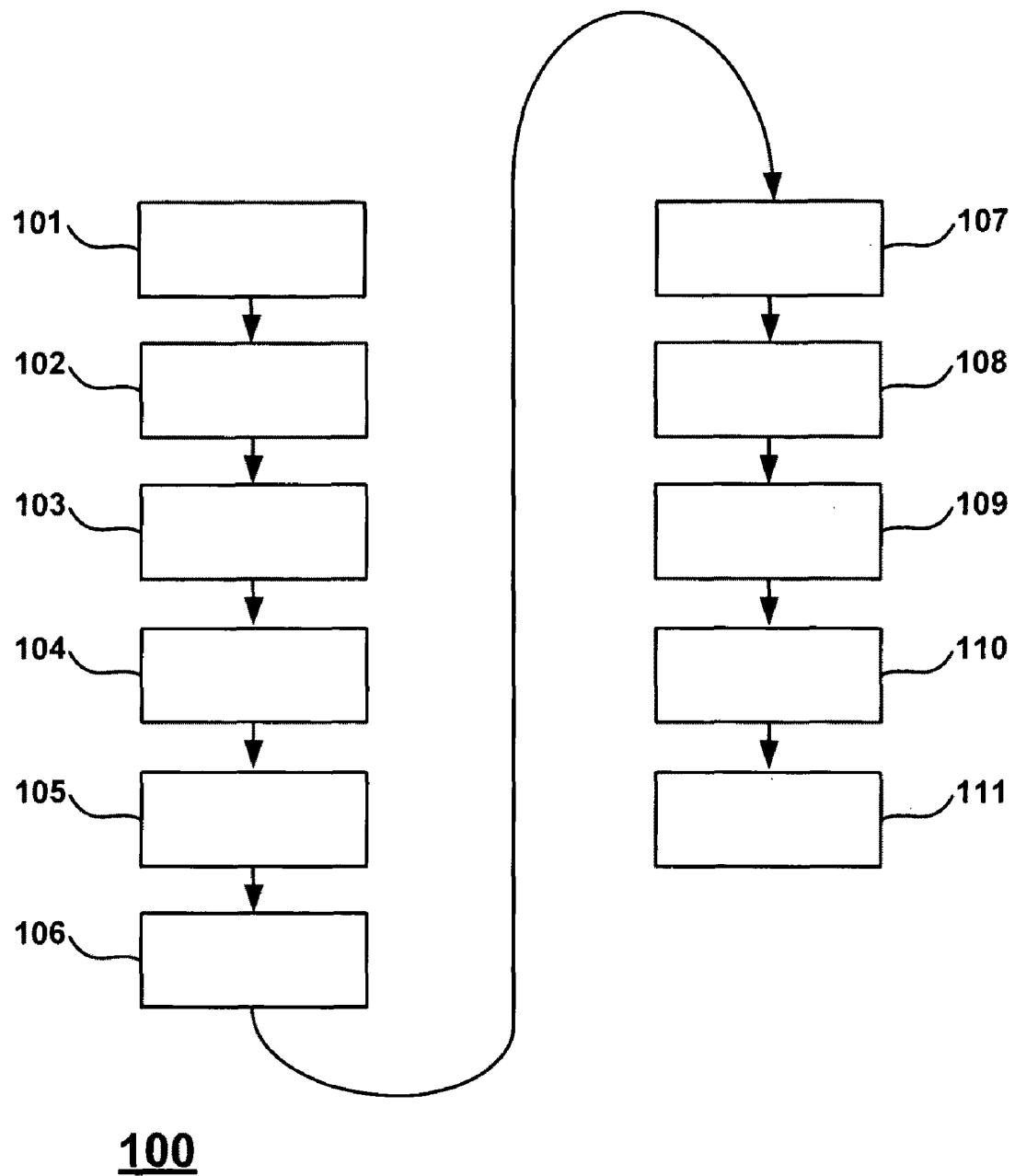
FIG. 10 is a flow diagram illustrating the steps of the method of this invention.

The present invention also contemplates a method for detecting operational radar angles to rapidly identify a range of optimum depression angles with a Graphical User Interface (GUI) in a computer. Referring now to FIG. 10, there is depicted a system flow chart illustrating this invention's method 100, comprising the steps initializing the GUI, represented by Box 101; connecting the computer to an airborne radar system and having a computer program using a MATLAB software package, represented by Box 102; forming a means for setting inputs in the GUI with a group of computer fields 103; selecting a terrain-type input from a group of terrain-type inputs causing the setting inputs means to provide a dielectric constant setting in a dielectric constant computer field and a conductivity setting in a conductivity setting computer field 104; and entering a carrier frequency input into a carrier frequency input computer field 105. The steps of the method of this invention continue with the steps of activating a means for calculations, which automatically selects a group of radar algorithms to populate an optimum depression angles field based on the terrain-type input, the dielectric constant setting, the conductivity setting, and the carrier frequency input, represented by Box 106; providing the range of optimum depression angle values from the optimum depression angles field 107; configuring a cross-correlation matrix of a plurality of horizontally and vertically polarized electromagnetic waves in the calculation means to identify a plurality of optimum depression angles for the purposes of reflection, as well as a ground penetration angle 108; and sending an optimum depression angle result from the calculations means directly to the airborne radar system that correlates a group of radar return properties that are generated in multiple, widely disparate bands, and the user may view a graphical display of said optimum depression angle result 109.

Many of the variations of the apparatus and system embodiments also apply to the method of the present invention.

These embodiments of the present invention are intended to be illustrative and not limiting with respect to the variety of possible embodiments. It is to be further understood that other features and modifications to the foregoing detailed description of the target detection apparatus, systems and methods are all considered to be within the contemplation of the present invention, which is not limited by this detailed description. Those skilled in the art will readily appreciate that any number of configurations of the present invention and numerous modifications and combinations of materials, components, geometrical arrangements and dimensions can achieve the results described herein, without departing from the spirit and scope of this invention. Accordingly, the present invention should not be limited by the foregoing description, but only by the appended claims.

What I claim is:

1. An operational radar angle detector apparatus to rapidly identify a range of optimum depression angles with a Graphical User Interface (GUI) in a computer, comprising:
    a means for initializing said GUI;
    said computer being connected to an airborne radar system and having a computer program using a software package with a technical computing language and interactive environment for algorithm development, data visualization, data analysis, and numeric computation;
    a means for setting inputs in said GUI having a plurality of computer fields;
    the user selects a terrain-type input from a plurality of terrain-type inputs causing said setting inputs means to provide a dielectric constant setting in a dielectric constant computer field and a conductivity setting in a conductivity setting computer field;
    a carrier frequency input is entered into a carrier frequency input computer field;
    a means for calculations is activated and said calculations means automatically selects a plurality of radar algorithms to populate an optimum depression angles field based on said terrain-type input, said dielectric constant setting, said conductivity setting, and said carrier frequency input;
    said optimum depression angles field provides said range of optimum depression angle values;
    said calculation means provides a cross-correlation matrix of a plurality of horizontally and vertically polarized electromagnetic waves where a plurality of optimum depression angles are identified for the purposes of reflection, and identifies a ground penetration angle; and said calculations means sends an optimum depression angle result directly to said airborne radar system that correlates a plurality of radar return properties that are generated in multiple, widely disparate bands.

2. The operational radar angle detection apparatus to rapidly identify optimum depression angles with said GUI in the computer, as recited in claim 1, further comprising display means for allowing the user to electively view or not view said optimum depression angle result in said display means.

3. The operational radar angle detection apparatus to rapidly identify optimum depression angles with said GUI in the computer, as recited in claim 2, further comprising said range of optimum depression angles can be viewed by the user moving a slider bar up or down.

4. The operational radar angle detection apparatus to rapidly identify optimum depression angles with said GUI in the computer, as recited in claim 3, wherein:
   said dielectric constant input being a real part of a complex dielectric constant $\in'$;
   said conductivity input being a conductivity $\sigma(S/m)$ of the earth's surface; and
   said carrier frequency input being a carrier frequency $f_c(Hz)$ of said airborne radar system.

5. The operational radar angle detection apparatus to rapidly identify optimum depression angles with said GUI in the computer, as recited in claim 4, further comprising the user selects said plurality of terrain-type inputs from a drop down menu.

6. A storage medium encoded with machine-readable computer program code for an operational radar angle detection system computer to rapidly identify a range of optimum depression angles with a Graphical User Interface (GUI), comprising:
   a means for initializing said GUI;
   said computer being connected to an airborne radar system and having a software package with a technical computing language and interactive environment for algorithm development, data visualization, data analysis, and numeric computation;
   a means for setting inputs in said GUI having a plurality of computer fields;
   the user selects a terrain-type input from a plurality of terrain-type inputs causing said setting inputs means to provide a dielectric constant setting in a dielectric constant computer field and a conductivity setting in a conductivity setting computer field;
   a carrier frequency input is entered into a carrier frequency input computer field;
   a means for calculations is activated and said calculations means automatically selects a plurality of radar algorithms to populate an optimum depression angles field based on said terrain-type input, said dielectric constant setting, said conductivity setting, and said carrier frequency input;
   said optimum depression angles field provides said range of optimum depression angle values;
   said calculation means provides a cross-correlation matrix of a plurality of horizontally and vertically polarized electromagnetic waves where a plurality of optimum depression angles are identified for the purposes of reflection, and identifies a ground penetration angle; and
   said calculations means sends an optimum depression angle result directly to said airborne radar system that correlates a plurality of radar return properties that are generated in multiple, widely disparate bands.

7. The storage medium encoded with machine-readable computer program code for the operational radar angle detection system computer to rapidly identify a range of optimum depression angles with said GUI, as recited in claim 6, further comprising display means for allowing the user to electively view or not view said optimum depression angle result in said display means.

8. The storage medium encoded with machine-readable computer program code for the operational radar angle detection system computer to rapidly identify a range of optimum depression angles with said GUI, as recited in claim 7, further comprising said range of optimum depression angles can be viewed by the user moving a slider bar up or down.

9. The storage medium encoded with machine-readable computer program code for the operational radar angle detection system computer to rapidly identify a range of optimum depression angles with said GUI, as recited in claim 8, wherein:
   said dielectric constant input being a real part of a complex dielectric constant $\in'$;
   said conductivity input being a conductivity $\sigma(S/m)$ of the earth's surface; and
   said carrier frequency input being a carrier frequency $f_c(Hz)$ of said airborne radar system.

10. The storage medium encoded with machine-readable computer program code for the operational radar angle detection system computer to rapidly identify a range of optimum depression angles with said GUI, as recited in claim 9, further comprising the user selects said plurality of terrain-type inputs from a drop down menu.

11. A method for detecting operational radar angles to rapidly identify a range of optimum depression angles with a Graphical User Interface (GUI) in a computer, comprising the steps of:
   initializing said GUI;
   connecting said computer to an airborne radar system and having a computer program using a software package with a technical computing language and interactive environment for algorithm development, data visualization, data analysis, and numeric computation;
   forming a means for setting inputs in said GUI with a plurality of computer fields;
   selecting a terrain-type input from a plurality of terrain-type inputs causing said setting inputs means to provide a dielectric constant setting in a dielectric constant computer field and a conductivity setting in a conductivity setting computer field;
   entering a carrier frequency input into a carrier frequency input computer field;
   activating a means for calculations and said calculations means automatically selects a plurality of radar algorithms to populate an optimum depression angles field based on said terrain-type input, said dielectric constant setting, said conductivity setting, and said carrier frequency input;
   providing said range of optimum depression angle values from said optimum depression angles field;
   configuring a cross-correlation matrix of a plurality of horizontally and vertically polarized electromagnetic waves in said calculation means to identify a plurality of optimum depression angles for the purposes of reflection, as well as a ground penetration angle; and
   sending an optimum depression angle result from said calculations means directly to said airborne radar system that correlates a plurality of radar return properties that are generated in multiple, widely disparate bands.

12. The method for detecting operational radar angles to rapidly identify a range of optimum depression angles with the GUI in the computer, as recited in claim 11, further comprising the step of electing to view or not view said optimum depression angle result in said display means.

13. The method for detecting operational radar angles to rapidly identify a range of optimum depression angles with the GUI in the computer, as recited in claim 12, further comprising the step of viewing said range of optimum depression angles by moving a slider bar up or down.

14. The method for detecting operational radar angles to rapidly identify a range of optimum depression angles with the GUI in the computer, as recited in claim 13, wherein:
   said dielectric constant input being a real part of a complex dielectric constant $\in'$;
   said conductivity input being a conductivity $\sigma(S/m)$ of the earth's surface; and
   said carrier frequency input being a carrier frequency $f_c(Hz)$ of said airborne radar system.

15. The method for detecting operational radar angles to rapidly identify a range of optimum depression angles with the GUI in the computer, as recited in claim 14, further comprising the step of selecting said plurality of terrain-type inputs from a drop down menu.

* * * * *